United States Patent Office 3,387,149
Patented June 4, 1968

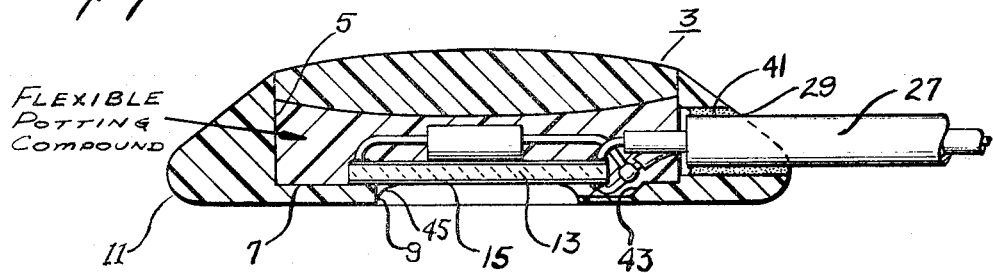
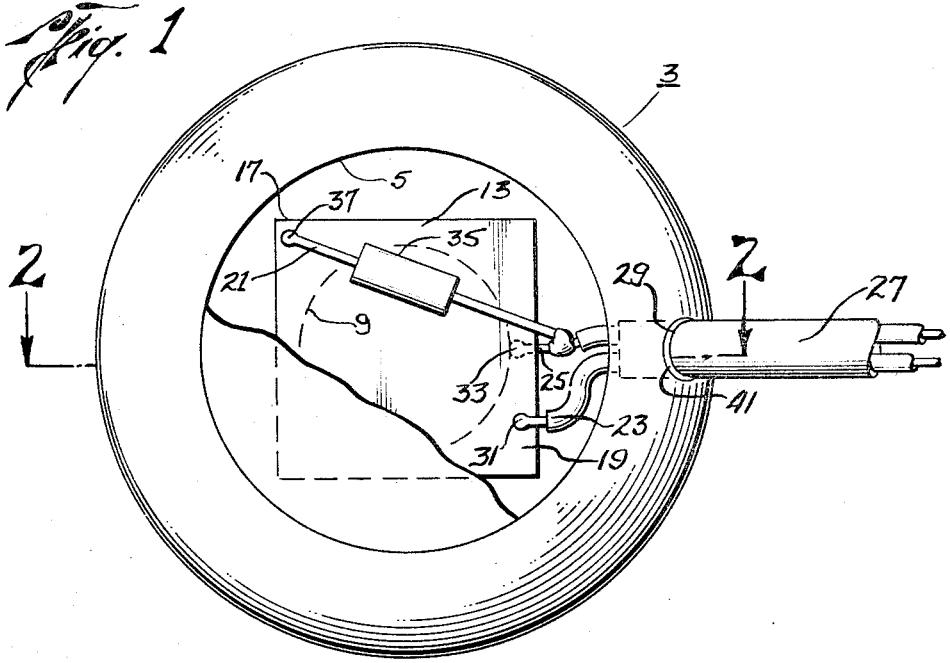

3,387,149
PHONOCARDIOGRAPH TRANSDUCER
William J. Young, Houston, Tex., assignor to the United States of America as represented by the Administrator of the National Aeronautics and Space Administration
Filed Dec. 21, 1965, Ser. No. 515,484
3 Claims. (Cl. 310—8.5)

ABSTRACT OF THE DISCLOSURE

A piezoelectric transducer for monitoring sound waves of physiological origin. The device is characterized by a nylon housing having a bore therethrough which provides an annular shelf on which is supported a piezoelectric plate at diagonally opposed points of the plate. Conductor leads are secured to both faces of the plate in a manner such that no conductor is in electrical contact with the subject. A resistor for determining low frequency response is electrically connected in parallel with the plate and mounted within the housing directly over the plate to reduce noise pickup. A first flexible potting compound placed directly over the plate fixes the resistor relative to the plate and insulates the circuit from moisture but does not hinder the low frequency vibrating characteristics of the plate. A second less flexible epoxy compound laid over the first potting compound is resistant to mechanical shock and is thermally and electrically insulative.

---

The invention described herein was made by an employee of the United States Government and may be manufactured and used by or for the Government for governmental purposes without the payment of any royalties thereon or therefor.

This invention pertains to microphones and more particularly to microphones for transducing mechanical energy signals of physiological origin into measurable electrical signals.

It is well-known that the application of mechanical energy across the surface of a piezoelectric element or plate causes it to expand and contract and generally vibrate along its edges, thus generating a corresponding electrical potential across the electrodes attached thereto. Utilization of this principle has resulted in a variety of electromechanical transducer devices which have been used for transmitting and receiving measurements of both sonic and subsonic energy waves, such as noise and shock vibrations. The transducers have been used in a broad spectrum of applications extending from military to medical purposes. Due to these diverse applications, varying structural characteristics must be incorporated into the piezoelectric device in order to enhance the particular type of signal which is to be monitored. A transducer intended for measurement of large amplitude shock waves, for example, must embody a piezoelectric plate firmly affixed within the transducer housing. In so doing the device becomes less sensitive to low amplitude vibrations since the sensitivity is related to its freedom of movement. Similarly, transducers used for detection of low amplitude sound waves, such as a heartbeat, require a plate having a less rigid structural connection in order to exhibit more sensitive vibratory characteristics. When the transducer is to monitor low amplitude signals in a shock type or vibrating environment, it is seen that the function of desirable structure components may tend to neutralize one another; that is the signal fidelity of a plate having a free vibratory characteristic so as to receive low amplitude sound waves would be significantly reduced by external vibratory disturbances. Other characteristics of the environment in which the transducer is to operate may exert a deleterious effect on its electrical output. A transducer used in a vibrating, high temperature environment must utilize certain materials which insulate it so as to prevent reduction of the plate efficiency due to heat. However, the materials often used to insulate the plate against heat tend to magnify rather than dampen external vibratory forces on the transducer body. Conversely, materials used to dampen vibration of the transducer body often have no heat insulation value. Still other design conditions are imposed as a consequence of the particular application for the transducer. Transducers to be used on an astronaut or test pilot for monitoring heartbeats, for example, must be of relatively small size so as to be easily securable to the skin and also so as not to be bothersome or uncomfortable even over extended periods of time. The construction of small piezoelectric transducers, however, is difficult since their output voltage is directly related to the distance separating the plate support points. Thus, it is difficult to construct a small piezoelectric transducer where a stringent voltage output requirement exists, such as in the present case.

In view of the discussion above, this invention is directed to a microphone to be used as a phonocardiograph transducer under environmental circumstances such as experienced by an astronaut. The device is characterized by a nylon housing in which there is supported a lead zirconate-lead titanate, ceramic piezoelectric plate. The plate is covered with a polyurethane electrical potting compound which, due to its flexibility when fully cured allows vibration of the plate although it is fully covered. There results a transducer capable of transmitting low amplitude signals despite inordinate shock loads, extreme velocity, acceleration, and deceleration without adverse effects on the output signal. Structural design of the transducer housing and supporting means for the piezoelectric plate contribute toward its effective transmission of signals over extended periods of time even under operating temperatures and humidity approaching 160° F. and 100%, respectively. Additionally, the transducer has an output voltage in the range of several millivolts peak-to-peak despite its relatively small size (less than one inch) and weight.

Other advantages and features of the invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a plan view of the transducer showing the relative position of the elements therein; and FIG. 2 is a sectional view along the plane 2—2 of FIG. 1.

With reference to the drawings, there is shown the housing 3 which is circular in plan view and has extending therethrough an opening defined by the vertical walls 5 and 9, each separated from the other by horizontal flange 7. The lower circumferential edge 11 of the housing is rounded so as to be less irritating to the skin of the wearer. Various materials may be used in forming the housing. It should in general exhibit resistance to shock, good heat dissipating characteristics and be relatively lightweight, the latter being advisable in order to reduce the tendency of the transducer to come loose from the wearer under conditions of high acceleration and deceleration. A housing made of nylon has been found to most satisfactorily achieve these requirements.

The substantially square piezoelectric plate 13, which has a thin silver coating 15 so as to permit soldering of the lead wires to the plate, is preferably made from a lead zirconate-lead titanate ceramic plate and is to be supported on flange 7 at diagonally opposite corners 17, 19. Since, the voltage output of the plate is inversely proportional to the width of the contact area at the support points and directly proportional to the distance which separates them, the size of the plate will vary in accordance with the output voltage required of a transducer in its particular application. It has been found for example in the present case where there is required a minimum voltage output of one (1) millivolt peak-to-peak that the plate, if made in square shape, should have sides approximately .4 inch in length so as to result in a diagonal length of .566 inch. Such is the size necessary to achieve the desired voltage output. It is found that a plate of this size will produce a satisfactory signal for substantially any phonocardiogram sensor which is to operate under the comparatively severe conditions previously discussed.

Prior to connection of the plate in the housing the various lead wires 21, 23, 25 should be affixed to the plate surfaces. The conduit 27 which contains the lead wires is first threaded through horizontal bore 29 in the side of the housing. The lead wire 23 is then affixed, as by solder joint 31 to the top of the plate and lead wire 25 is affixed by solder joint 33 to the bottom of the plate, each in the positions noted in the drawing. The third lead wire 21 having a 470K ohms, 1/10 watt carbon resistor 35 therein is soldered to lead 25 as the latter exits from bore 29, and connected by solder joint 37 at opposite diagonal corner 17 of the plate. The resistor is thus, in parallel with the terminals of the plate and serves to alter the low frequency response of the transducer. In this manner the low frequency response from the device can be varied depending upon whatever may be desired. After the leads are soldered, the flange 7 in the housing should be cleaned so as to evenly receive the plate upon its insertion. Use of an acetone cleaner will accomplish this purpose. An appropriate adhesive coating, such as Eastman 910 manufactured by Eastman Chemical Products, Inc. of Kingsport, Tenn., is then applied to the housing flange 7 immediately beneath the positions of the opposite diagonal corners 17, 19 of the plate. In addition, adhesive coating 41 may be applied around main conduit 27 at bore 29 in the housing so as to prevent the entrance of humidity therein. The solder joint 33 is then slid into pre-formed recess 43 in the housing flange and the plate positioned on the support points which are coated with adhesive. Downward pressure should then be applied on the plate for a period of approximately one (1) minute. It will be recognized that the plate could be supported at any of a number of oppositely disposed points or at diagonally opposite corners. Likewise, the plate may take various shapes, all in accordance with the desired output voltage and other factors discussed above. Once the plate is secured the space directly above it is partially filled with a potting compound which, when cured, remains flexible so as to not impair the vibrating quality of the plate. A potting compound such as PRC #1538 polyurethane resin, commercially marketed by the Products Research Co. of Burbank, Calif., is found acceptable for this purpose. In addition to maintaining the resistor in fixed relation to the plate while permitting the plate to freely vibrate, the compound serves to effectively insulate the internal circuit against moisture in the atmosphere and also from perspiration from the body to which the transducer is in contact. The PRC #1538 resin should be cured for approximately six (6) hours at a temperature of 180° F. When this is completed the remainder of the cavity is filled with a less flexible epoxy compound. This compound, when cured, should exhibit exceptional resistance to mechanical shock and should have good thermal insulative characteristics. It should, in addition, be at least partially flexible even after severe heat aging and should have good electrical insulative properties. The "Scotchcast" #8 resin marketed by the Minnesota Mining & Mfg. Co. is a preferred potting compound for this purpose. Upon filling of the upper cavity, the resin should be allowed to cure for approximately six (6) hours at 140° F. An appropriate potting material 45, such as the Scotchcast #8 should also be applied to the interface junction between plate 13 and the circumferential opening defined by vertical wall 9. It is found upon curing of the resin layers that the present transducer, which is less than one (1) inch in size, is capable of a sustained voltage output of several millivolts in environmental temperatures of up to 200° F. for extended periods of time and as low as 30° F. for up to four (4) hours. It is unaffected by humidity at room temperatures for up to a period of 14 days and can undergo without deleterious effects, a shock of 40 times the force of gravity. In use the microphone is merely placed with the piezoelectric plate directly against a person's body adjacent the organ which is to be monitored. The conductors in the main conduit are connected to an electric amplifier (not shown) which may include a speaker, earphones, or a sound recording means, whichever is preferred. The sound from the body is imparted to the plate, causing it to vibrate and thus varying the voltage output.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A device for converting mechanical energy into an electrical signal and particularly adapted for monitoring sound waves of physiological origin, said device comprising:

an electrically nonconductive housing having a lower surface adapted to abut a body from which sound is emitted, said housing having a bore extending therethrough and providing an opening in said lower surface thereof;

means supporting a piezoelectric plate in said housing over said opening and in substantially parallel and spaced relation to said lower surface whereby said plate is supported in spaced relation to the surface of a body from which sound is to be monitored;

a pair of electrical conductor means affixed to said housing and electrically connected to opposite sides of said plate for conducting electrical signals from said piezoelectric plate;

insulation means for insulating said conductor means from electrical contact with a body to be monitored by said device;

electrical resistance means connected electrically in parallel with said plate for controlling the low frequency response of said device, said resistance means being disposed within said housing substantially adjacent said plate; and a flexible potting means overlying said plate for electrically and thermally insulating said plate while allowing the free vibration thereof.

2. A device for converting mechanical energy into an electrical signal as described in claim 1 further including shock resistant thermal and insulative potting means overlaying said flexible potting means.

3. A device for converting mechanical energy into an electrical signal as described in claim 1 wherein said means supporting said piezoelectric plate provide substantially point supports for said plate at perimetrically opposed points thereof.

References Cited

UNITED STATES PATENTS

| | | | |
|---|---|---|---|
| 3,239,696 | 3/1966 | Burkhalter | 310—8.3 |
| 3,148,677 | 8/1964 | Smith | 310—8.3 |
| 3,166,730 | 1/1965 | Brown | 340—10 |
| 2,967,957 | 1/1961 | Massa | 310—9.4 |

J. D. MILLER, *Primary Examiner.*